J. F. CLASS.
FUMIGATING APPARATUS.
APPLICATION FILED MAR. 27, 1915.
1,180,241.
Patented Apr. 18, 1916.
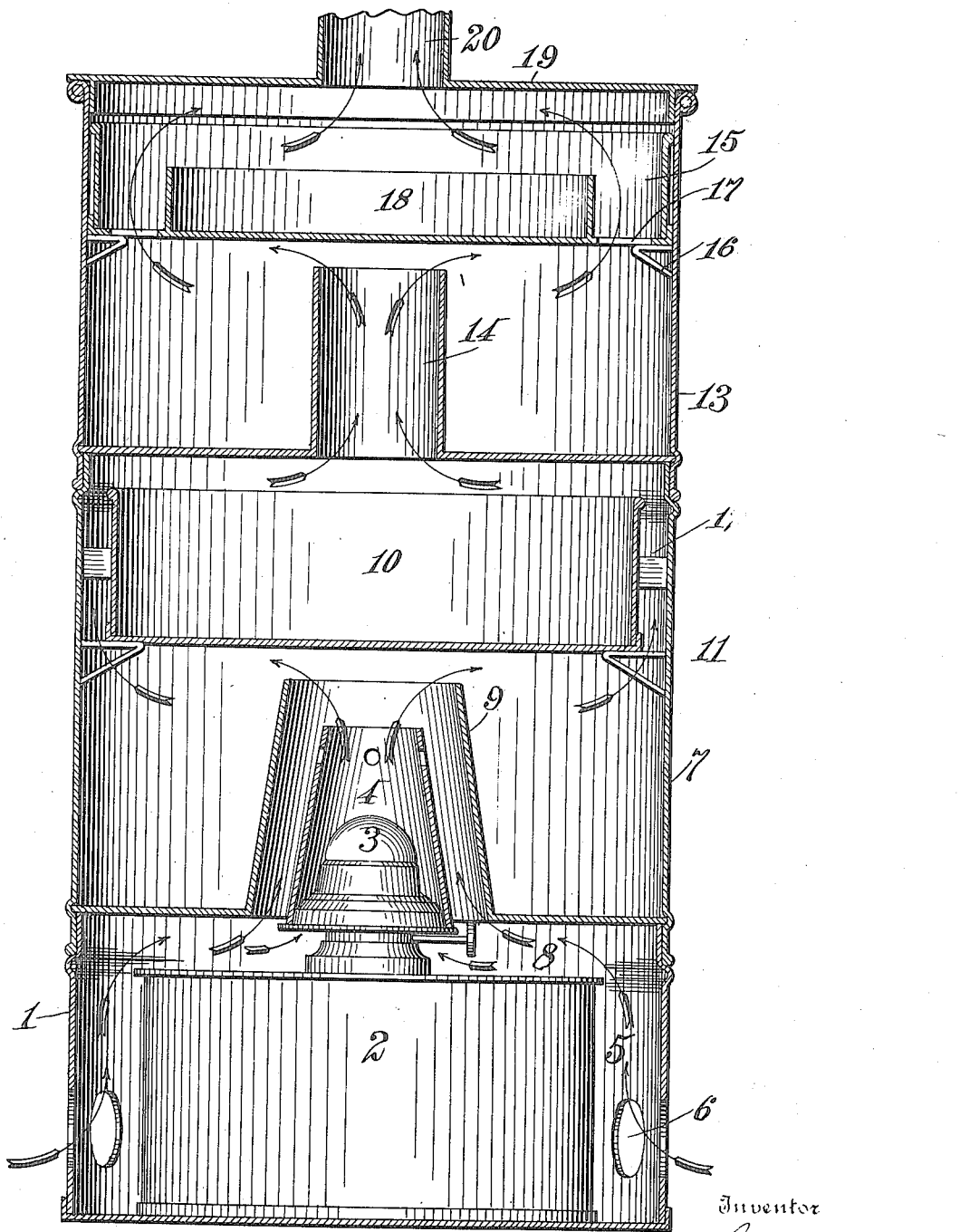

UNITED STATES PATENT OFFICE.

JOHN F. CLASS, OF DAYTON, OHIO.

FUMIGATING APPARATUS.

1,180,241. Specification of Letters Patent. Patented Apr. 18, 1916.

Application filed March 27, 1915. Serial No. 17,362.

*To all whom it may concern:*

Be it known that I, JOHN F. CLASS, citizen of the United States, residing at Dayton, in the county of Montgomery and State of Ohio, have invented certain new and useful Improvements in Fumigating Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in fumigators for disinfecting buildings and premises, and comprises more specifically an apparatus through which the fumigation of premises and places may be had in a most satisfactory and thorough manner.

The object of the invention is primarily to provide an apparatus for farm use in caring for swine, chickens, etc.

The disinfecting or fumigating substance or material forms the subject-matter of another and separate patent application. The present improvements relate to an apparatus for containing the substance or material and from which the fumes are emitted and caused to circulate to any place that it may be desired to disinfect.

The accompanying drawing is a longitudinal vertical sectional elevation of my improved fumigating apparatus.

The structure is such that an ascending current of hot air, vapor, etc., heavily laden with fumigating substance, circulates around and over a series of vats which contain disinfectant material and mixing with the same carries it out through the top of the apparatus from which point it is conveyed to any place where fumigation may be desired, either by means of permanent piping or by a flexible pipe, such as hose.

In said drawing, the lower or base receptacle 1 contains a fuel reservoir or lamp body 2, the burner 3 of which is inclosed by a chimney 4. An air space 5 surrounds the fuel reservoir and receives air through a series of openings 6 around the wall of said base 1. A liquid receptacle or container 7 is mounted above the base 1, there being a suitable space 8 between the bottom of said container 7 and the lamp for the air to circulate through to a truncated inclosure 9. This truncated member 9 extends from the bottom of the container 7 and provides an air passage around the lamp chimney 4. The container 10 superposed above the container 7 is a liquid container and is removable from its position as shown. It is supported on brackets 11 a proper distance above the top of the truncated inclosure 9 and the heat from the lamp is directed against the bottom and is deflected around the sides thereof. The moist heat rising from the liquid in the container 7 mixes with the heated air emerging from the top of the lamp chimney. The solution contained in the container 7 is not a disinfecting medium but that in the container 10 is, and the hot moist air rising from below the container 10 spreads over the top thereof, after passing through the circumferential passage 12, and mixes with the vapor arising from said container 10.

Supported above the container 10 is another container 13 which forms the uppermost detachable section of the apparatus. The bottom of the container 13 lies in a suitable position above the mouth of the container 10 to form a wall which deflects the vapor rising from said container 10 commingled with the air and vapor from below said container 10. A centrally disposed outlet is provided in the bottom of said container 13 for the vapor, air, etc., to pass upwardly. This consists of a tube 14 which extends approximately the depth of the container 13, and thereabove is located a pan 15 which is removably supported on brackets 16. The bottom of the pan 15 acts as a baffle wall which lies close to the upper end of the tube 14 and causes the vapor to spread as it passes upwardly through said tube. Near the outer margin of the bottom of the pan 15, a series of openings 17 are provided through which the vapor, etc., passes into the pan 15 and over a shallow pan 18 which projects upwardly from the bottom of the pan 15. This pan 18 contains a disinfectant. From the courses indicated in the drawing by the several arrows, it will be noted that there is a succession of disinfectant containers arranged in the path of the rising air and moisture.

The top cover 19 of the apparatus fits snugly and the center thereof is provided with a spout 20 through which the fumes escape and may be conducted to any part of the premises it may be desired to fumigate.

The fumes may be utilized to disinfect hospitals and, owing to the character of the disinfectant used in the apparatus, it is especially useful as a destroyer of malignant germs, such as are prevalent in tuberculosis, smallpox, diphtheria, etc.

Having described my invention, I claim—

1. In an apparatus of the character specified, the combination of an initial air container, a heat generator located therein surrounded by an air space, a container located thereabove for generating vapor, said vapor generator having a centrally disposed extension providing an upward passage for the air from said initial air container, a superposed disinfectant container above said vapor generator surrounded by an air and vapor passage, and supplementary disinfectant containers superposed above said first named disinfectant container and one above the other, one of said last named containers having a central inclosed passage, and the other of said last named containers having marginal passages whereby a continuous circulation is provided throughout the length of the apparatus, and means for conducting the air and vapor from the uppermost container, substantially as specified.

2. An apparatus of the character specified, comprising a series of superposed containers, the lowermost one of said containers having a series of air admission orifices, an upper adjacent container forming a vapor generator communicating with said lowermost container, a heat generator within said lowermost container the burner of which extends into said upper adjacent container, a frusto-conical shaped member within said upper adjacent container inclosing said burner and forming an up-passage from the lowermost container, and the disinfectant containers 10, 13 and 15 mounted one above the other and communicating one with the other by means of the central and circumferential passages, substantially as described.

In testimony whereof I affix my signature, in presence of two witnesses.

JOHN F. CLASS.

Witnesses:
MELLIE S. GALLOWAY,
MATTHEW SIEBLER.